Dec. 4, 1962 V. C. SHAW 3,066,916
WIRE OR CABLE PULLER
Filed Aug. 12, 1960
FIG. 1.
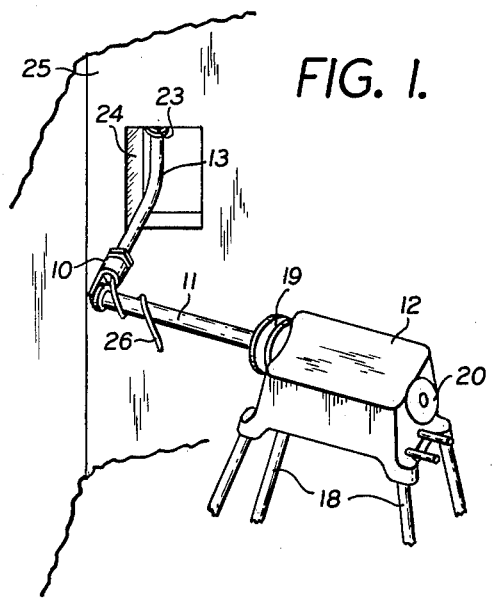
FIG. 2.
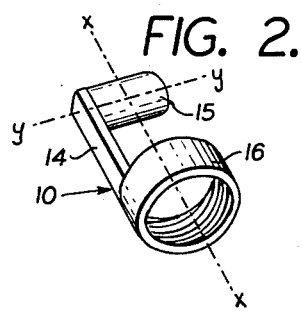
FIG. 3.
FIG. 3A.
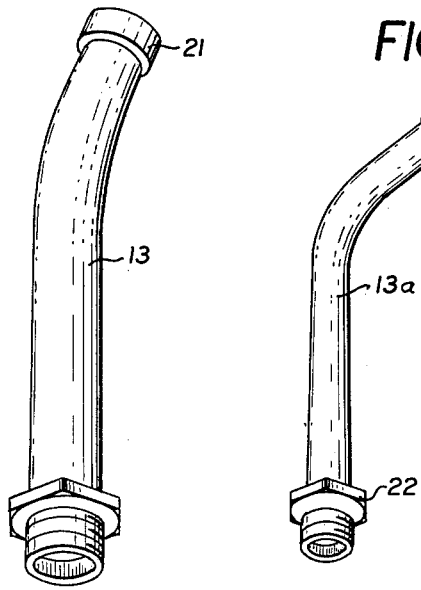
FIG. 4.
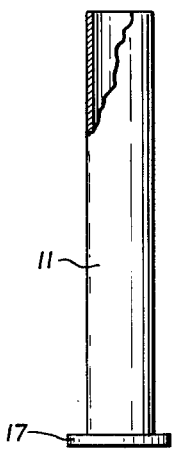
INVENTOR
VERNON C. SHAW
BY
Byerly, Townsend, Watson & Churchill
ATTORNEYS.

United States Patent Office 3,066,916
Patented Dec. 4, 1962

3,066,916
WIRE OR CABLE PULLER
Vernon C. Shaw, Circleville, N.Y.
Filed Aug. 12, 1960, Ser. No. 49,301
4 Claims. (Cl. 254—134.3)

The present invention relates to apparatus for pulling electrical conductors or wires through conduits or pipes used in building construction work and aims to provide certain improvements in such apparatus.

It is common practice in building construction to pull electrical conductors through conduits either by hand or by pulling machines. The hand pulling operation is strenuous and time consuming. The pulling machines now available although efficient are cumbersome and costly.

Accordingly, it is an object of the invention to utilize a portable pipe threading machine which is conventionally used on all jobs requiring installation of heavy electrical conductors for supplying the motive power for the conductor or wire pulling operation.

A further object of the invention is to provide simple fittings and an adapter in combination with a portable pipe threading machine for facilitating the use of such machine for the purpose set forth.

A still further object of the invention is to provide for use in conjunction with a pipe threading machine of novel means which will insure that all force applied to pulling the conductors through the conduits will be so applied as to preclude the danger of deforming the conductor cabinet or panel box or of pulling the conduit from its support.

The foregoing and other objects of the invention, not specifically enumerated, I accomplish by employing a conventional portable pipe threading machine in combination with a rotatable drum adapted to be chucked in such machine and constitutes a windless, an adapter and selectively with one or more tubular pulling sleeves, in such manner that a strong pulling force can be applied to a rope secured to one end of an electrical conductor and engaged around the drum to pull the conductor through the conduit. The invention will be fully understood from the detailed description which follows when considered in connection with the accompanying drawing wherein:

FIG. 1 is a perspective view of the apparatus of the present invention in operative relation to a wall junction box and a conduit leading thereinto and through which conduit an electrical conductor is to be pulled.

FIG. 2 is a perspective view of an adapter constituting essential part of the apparatus.

FIGS. 3 and 3A are perspective views of tubular pulling sleeves forming part of the apparatus.

FIG. 4 is an elevation, partly broken away, of a rotatable drum forming part of the apparatus.

Referring to the drawing, wherein the invention is disclosed for the purpose of illustration, the apparatus may be said to comprise essentially an adapter 10, a rotatable drum 11, means 12 for rotating the drum and one of a group of tubular pulling sleeves 13 and 13a.

The adapter 10 consists of an elongate rigid supporting member 14 having at one end a cylindrical stud or bearing 15 disposed substantially perpendicular to the supporting member and having at its opposite end in longitudinal spaced relation to the stud, means 16 in the form of an internal threaded annulus disposed substantially tangentially to the support, the axis x—x of the annulus and the axis y—y of the stud or bearing 15 being disposed substantially perpendicular to each other.

The rotatable drum 11 may conveniently be in the form of a hollow tube provided with a flange 17 at one end thereof, the internal diameter of the tube being of a size to slip-fit onto cylindrical stud 15.

The means 12 for rotating the drum is preferably a conventional portable pipe threading machine mounted on a plurality of legs 18 and having a chuck 19 within which the rotatable drum 11 may be clamped and rotated by an electric motor 20 or other suitable means.

The tubular pulling sleeves 13 and 13a are preferably non-rectilinear and have their ends disposed angularly in relation to each other. The tubular pulling sleeves at one end are each provided with an internally threaded coupling nut 21 and at its other end with a externally threaded coupling sleeve or union 22. Preferably the coupling nut 21 and union 22 are swivelly mounted on the tubular pulling sleeves to facilitate connection with the threaded end of a conduit 23 and the internally threaded annulus 16 respectively. As is well understood the ends of the conduits 23 engage and terminate in a conduit cabinet or junction box 24 mounted in a wall 25 of a building or the like.

In the use of the present apparatus for pulling electrical conductors through conduits, one end of the conductor which is to be drawn through a conduit has attached thereto a cable or rope which is threaded through the conduit and then through a tubular pulling sleeve 13 which is preferably of a length to extend externally of the junction box, the coupling nut 21 is threadedly connected to the end of the conduit which extends into the junction box. The opposite end 22 of the pulling sleeve is then threaded into the annulus 16 of the adapter 10, the flanged end 17 of the drum 11 is then positioned over the cylindrical stud 15 into engagement with the supporting member 14 and the opposite end of the drum is then chucked in the pipe threading machine and the free end of the cable or rope 26 is given one or two turns around the drum 11. When the pipe threading machine is set in operation, and with a small amount of tension imparted to the pulling cable 26, the drum will create a powerful pull on the cable and act as a windlass to draw the electrical conductor or wire through the conduit. Where the junction box 24 is disposed at a height substantially above the height of the pipe threading machine or is so located as to render impracticable positioning of said machine in proximity to the corner of a room, the tubular pulling sleeve may be provided with a straight line extension (not shown) to accommodate the machine and the rotatable drum in proper relation to the junction box to accomplish the desired wire pulling operation.

It will be obvious that in view of the fact that the pulling force is only applied to the cable attached to the conductor, no strain is applied to the wall of the junction box or upon the conduit through which the conductor is drawn, wherefore all danger of deforming the junction box or of pulling the conduit from its support is eliminated.

While I have shown and described a preferred embodiment of my invention, it is to be understood that changes in details of construction of the various parts may be made within the range of mechanical skill without departing from the spirit of the invention as hereinafter claimed.

What I claim is:

1. In a portable apparatus for pulling electrical conductors through conduits connected to electrical junction boxes, in combination, a non-rectilinear tubular pulling sleeve having coupling means at its ends which are disposed angularly in relation to each other and of a length to extend from a conduit end in a junction box to beyond the front wall of such box, a portable windlass drum, and an adapter for interposition and detachable connection to the end of the pulling sleeve remote from the conduit and to one end of the windlass drum, said adapter comprising an elongate rigid supporting member having at one end coupling means for attachment to said remote end of the tubular pulling sleeve and at its other end having a cylindrical bearing for one end of the windlass drum, the axis of said bearing and the axis of the coupling means on said adapter being angularly disposed to each other with said coupling means being spaced from the cylindrical bearing to permit the passage through said coupling means and engagement around the end of the windlass drum adjacent the adapter of a pull-rope attached to one end of an electrical conductor.

2. Apparatus according to claim 1, wherein the coupling means on the adapter is a socket, the axis of which and the axis of the cylindrical bearing on the adapter are substantially perpendicular to each other.

3. Apparatus according to claim 1, wherein the combination includes a portable pipe threading machine having a rotatable chuck in which the other end of the windlass drum is adapted to be gripped for rotation.

4. In a portable apparatus for pulling electrical conductors through conduits connected to electrical junction boxes, in combination, a tubular pulling sleeve, a windlass drum and an adapter interposed and detachably connected to an end of said tubular pulling sleeve and to one end of said windlass drum, said adapter consisting of an elongated rigid supporting member having at one end thereof and extending substantially tangentially thereto, an annular coupling means for attachment to an end of the tubular pulling sleeve and the other end of the supporting member having extending substantially perpendicularly thereto, a cylindrical bearing for one end of the windlass drum, the axis of said cylindrical bearing and the axis of the annular coupling means being substantially perpendicular to each other and said annular coupling means being disposed in unobstructed spaced relation to the cylindrical bearing to permit the passage through said annular coupling means of a pull-rope after passing through the pulling sleeve for engagement around the windlass drum adjacent the adapter.

References Cited in the file of this patent
UNITED STATES PATENTS

| | | |
|---|---|---|
| 2,286,781 | Abramson et al. | June 16, 1942 |
| 2,451,062 | Booth | Oct. 12, 1948 |
| 2,581,306 | Slotterback | Jan. 1, 1952 |
| 2,838,280 | Eyles | June 10, 1958 |
| 2,896,911 | Carpenter | July 28, 1959 |
| 2,930,584 | Hensley et al. | Mar. 29, 1960 |